United States Patent
Spengler

(10) Patent No.: US 7,699,595 B2
(45) Date of Patent: Apr. 20, 2010

(54) METHOD AND APPARATUS FOR MOLDING A LAMINATED TRIM COMPONENT WITHOUT USE OF SLIP FRAME

(75) Inventor: Gerhard Spengler, Frankfurt (DE)

(73) Assignee: R + S Technik GmbH, Offenbach am Main (DE)

( * ) Notice: Subject to any disclaimer, the term of this patent is extended or adjusted under 35 U.S.C. 154(b) by 1093 days.

(21) Appl. No.: 11/155,045

(22) Filed: Jun. 17, 2005

(65) Prior Publication Data

US 2006/0012075 A1 Jan. 19, 2006

(30) Foreign Application Priority Data

Jul. 19, 2004 (DE) .................. 10 2004 034 792
Mar. 2, 2005 (EP) .................. 05004510

(51) Int. Cl.
*B29C 51/20* (2006.01)

(52) U.S. Cl. .................. 425/149; 425/150; 425/390; 425/394; 425/397; 425/520; 264/291; 264/294

(58) Field of Classification Search .................. 425/140, 425/149, 150, 390, 394–398, 403, 518–521; 264/291, 294

See application file for complete search history.

(56) References Cited

U.S. PATENT DOCUMENTS

| | | | |
|---|---|---|---|
| 3,115,678 A | | 12/1963 | Keen et al. |
| 3,584,109 A | * | 6/1971 | Meadors et al. .............. 425/398 |
| 4,228,121 A | * | 10/1980 | Meadors .................. 425/398 |
| 4,832,676 A | * | 5/1989 | Johns et al. .................. 493/152 |
| 4,923,539 A | | 5/1990 | Spengler et al. |
| 5,076,880 A | | 12/1991 | Spengler et al. |
| 5,199,595 A | | 4/1993 | Muggli et al. |
| 5,413,661 A | | 5/1995 | Spengler et al. |
| 5,718,791 A | | 2/1998 | Spengler |
| 6,136,415 A | | 10/2000 | Spengler |
| 6,183,234 B1 | * | 2/2001 | Weder et al. .................. 425/136 |
| 6,214,157 B1 | | 4/2001 | Spengler |
| 6,287,678 B1 | | 9/2001 | Spengler |
| 6,524,510 B2 | | 2/2003 | Spengler |

(Continued)

FOREIGN PATENT DOCUMENTS

DE 36 07 647 9/1987

(Continued)

*Primary Examiner*—Richard Crispino
*Assistant Examiner*—Thu Khanh T Nguyen
(74) *Attorney, Agent, or Firm*—W. F. Fasse; W. G. Fasse

(57) ABSTRACT

An apparatus for producing a molded product from a sheet-form raw material blank has first and second mold tools that each respectively include a respective inner core mold and a respective outer edge mold laterally adjacent thereto. Drive elements drive the outer edge molds relative to a machine frame, and drive the inner core molds relative to the outer edge molds. A molding process involves closing the outer edge molds to hold an edge rim of the material blank while allowing slippage thereof, and then closing the inner core molds to three-dimensionally deform and mold a central portion of the material blank while pulling required additional material by slippage through the outer edge molds. A separate slip frame is not used. The edge rim held by the outer edge molds remains as a permanent mounting rim or flange of the finished molded product. Edge waste is minimized.

25 Claims, 3 Drawing Sheets

U.S. PATENT DOCUMENTS

| | | | |
|---|---|---|---|
| 6,527,687 B1 * | 3/2003 | Fortney et al. | 493/142 |
| 6,749,794 B2 | 6/2004 | Spengler | |
| 7,195,477 B2 * | 3/2007 | Ikeda et al. | 425/395 |
| 2003/0041955 A1 | 3/2003 | Spengler | |

FOREIGN PATENT DOCUMENTS

| | | |
|---|---|---|
| DE | 198 29 352 | 1/2000 |
| EP | 1 097 794 | 5/2001 |
| EP | 1 211 051 | 6/2002 |
| JP | 2003-276076 * | 9/2003 |

* cited by examiner

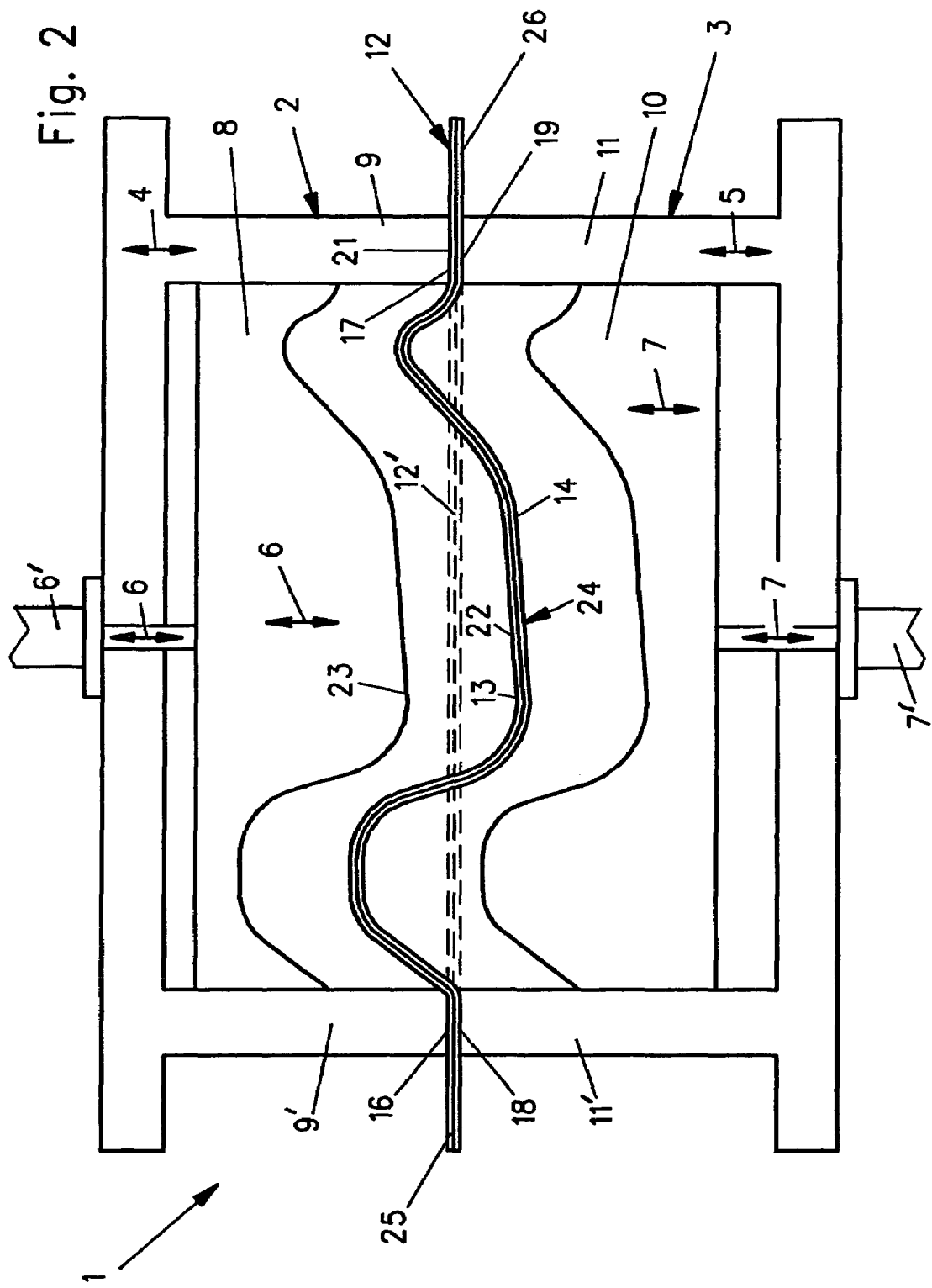

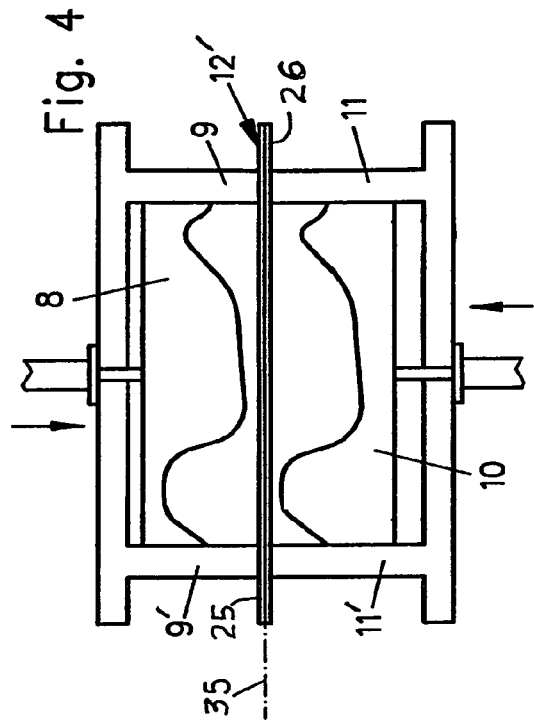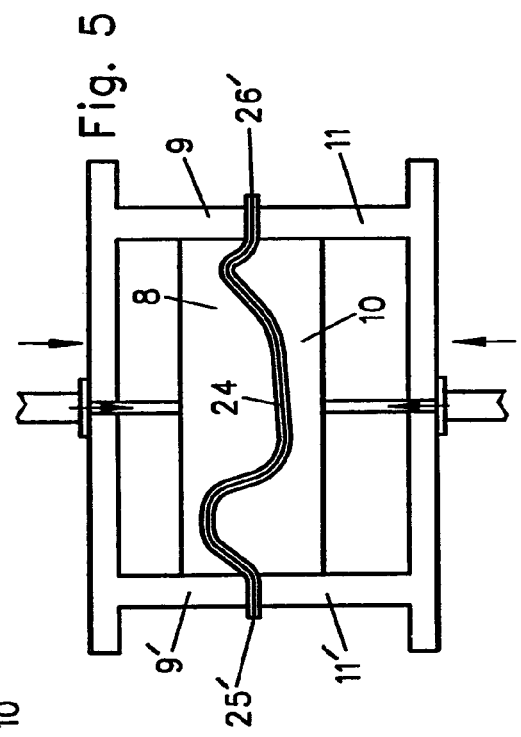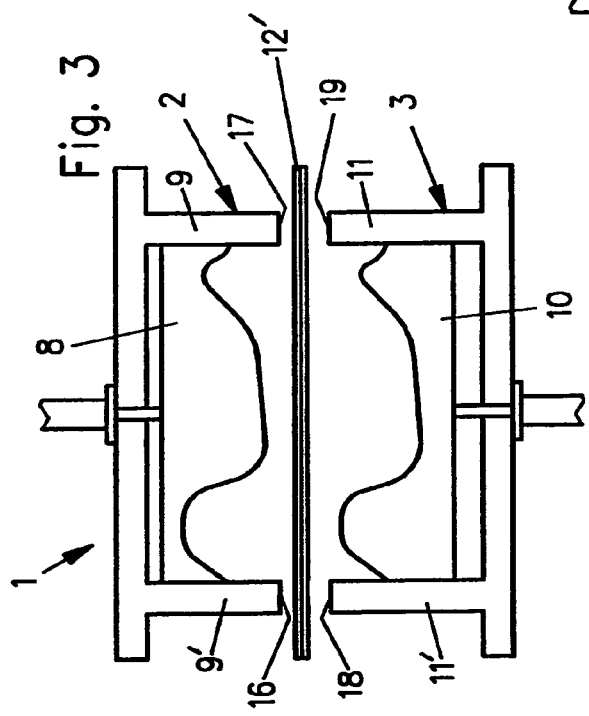

METHOD AND APPARATUS FOR MOLDING A LAMINATED TRIM COMPONENT WITHOUT USE OF SLIP FRAME

PRIORITY CLAIM

This application is based on and claims the priority under 35 U.S.C. §119 of German Patent Application 10 2004 034 792.1, filed on Jul. 19, 2004, and European Patent Application 0 50 04 510.3, filed Mar. 2, 2005, the entire disclosures of both of which are incorporated herein by reference.

FIELD OF THE INVENTION

The invention relates to a method and an apparatus for molding products, such as interior trim components for motor vehicles, from multi-layered sandwich laminate raw material blanks.

BACKGROUND INFORMATION

It is well known to produce laminated molded products, such as interior trim components for motor vehicles, from raw material blanks or webs or mats of multi-layered raw material, for example including thermoplastic fibers that serve as a thermoplastic meltable adhesive and matrix, as well as other fibers serving as a reinforcement or filler. A great variety of different methods and apparatuses for molding such a multi-layered raw material to produce a molded laminated product are also known in the art. For example, such known methods and apparatuses are disclosed in U.S. Pat. No. 6,749,794, U.S. Pat. No. 6,524,510, U.S. Pat. No. 6,287,678, U.S. Pat. No. 6,214,157, and many others.

The above mentioned methods and apparatuses are typically used especially for producing interior trim components, such as door panels and inserts, dashboards and dashboard inserts, consoles, headliners, parcel shelves and the like, for motor vehicles. Such trim components are generally produced by laminating, molding and cutting a laminated sandwich-type raw material blank formed of multiple layers, for example including a decorate cover sheet, a foam layer, and a structural carrier or substrate layer. The molding process involves heating the raw material and then deforming the heated and softened raw material in a mold apparatus under the required pressure, whereby the several layers of material are laminated and bonded with one another and molded into the desired three-dimensional contoured configuration. The lamination bonding can be achieved using an additional adhesive, or by using thermoplastic fibers of the raw material blank as a hot-melt adhesive. The processing temperatures for the molding processes are typically around 200° C.

The substrate or carrier layer may initially include thermoplastic fibers, for example of polypropylene, forming the matrix and hot-melt adhesive of the substrate, as well as reinforcing or filler fibers, such as preferably natural fibers or other non-melting fibers. For example, these reinforcing fibers can be synthetic plastic fibers, such as polyester fibers, that do not melt or only melt at temperatures greater than the arising process temperatures. The other layers such as a foam layer and/or a decorative cover layer may comprise any conventionally known or future developed materials typically used in the field of this invention. The substrate or carrier layer may also comprise any conventionally known or future developed materials suitable in the field of this invention. The present invention is applicable to the molding of sheet-like or web-like raw materials, or raw material blanks, regardless of the particular material composition or the number of layers thereof.

The conventionally known apparatuses for carrying out the molding of such a laminated sandwich-type raw material blank typically include a machine frame carrying at least an upper mold tool and a lower mold tool that are driven by drive elements such as piston-cylinder devices, so that the upper and lower mold tools are movable relative to each other, and thus form a mold that can be opened and closed. The conventional apparatuses typically further include a control arrangement for controlling the drive elements for moving the upper and lower mold tools relative to each other. Still further, the conventional apparatuses typically include a raw material transport arrangement that grasps, carries and transports a raw material blank to a position between the upper and lower mold tools, as well as a clamping frame or slip frame that takes over the raw material blank from the material transport arrangement and holds the raw material blank in the proper position between the upper and lower mold tools while the molding process is carried out.

Particularly, the slip frame frictionally holds a surplus edge rim of the raw material blank protruding laterally outwardly from the edge of the mold. The slip frame holds the surplus edge rim with a sufficient clamping force to support and hold the raw material blank in position, while still allowing the raw material blank to slip laterally toward and into the mold as the molding deformation of the raw material blank is carried out. Namely, as the upper and lower mold tools are pressed together and thereby deform the raw material blank from its initial flat planar configuration into a three-dimensionally molded contoured configuration, this deformation takes up additional material and thus inwardly pulls the surplus edge rim of the material, which is allowed to slip inwardly through the slip frame. In this regard, for example see U.S. Pat. No. 6,524,510, U.S. Pat. No. 6,136,415, U.S. Pat. No. 5,413,661, U.S. Pat. No. 5,076,880, etc.

The conventionally known apparatuses as described above suffer several disadvantages arising directly due to the use of the slip frame. Most importantly, the use of a slip frame necessarily requires the provision of a rather large surplus edge rim of the raw material protruding laterally beyond the edge of the mold. This surplus edge rim of the material represents waste that is ultimately cut or trimmed from the edge of the finished molded product. For large surface area products, the relative proportion of the edge rim waste is relatively small. However, the edge rim waste becomes gravely significant in connection with relatively small products or products that are relatively narrow but long. In general, the conventionally known methods and apparatuses require a surplus edge rim, and thus ultimately an edge rim waste, of at least 40 to 50 mm on each side of the mold. This is conventionally unavoidable because the conventional slip frame is spaced laterally by at least about 10 mm away from the outer edges of the mold, the slip frame itself typically has a width of at least about 25 mm, and a surplus rim edge protruding at least about 15 mm outwardly from the slip frame is typically left to allow for the slippage during molding as well as to allow a clamp frame or needle frame of a material transport mechanism to grasp the edges of the material. This gives an ultimate material waste of at least 40 to 50 mm on each side of the mold, i.e. on each side of the molded product. This can result in about 20% material waste when molding a typical motor vehicle door panel, for example. Especially when using high value raw materials, such as natural leather cover layers or the like, the amount of material waste becomes a significant cost factor and must be reduced to provide an economic advantage.

A further disadvantage of using a conventional slip frame is that the overall apparatus then takes up a lot of space, i.e. is very large due to the extra space required by the slip frames at the sides of the mold tools. The conventional arrangements thus often take up an unacceptably large space, regardless whether relatively small-area products or relatively large-area products are being produced. As a result, the overall molding system takes up a disproportionately large space and is especially very long in comparison to the length of the product being produced.

SUMMARY OF THE INVENTION

In view of the above, it is an object of the present invention to provide a method and an apparatus for molding a sheet-form material to produce a molded product, while avoiding the use of a separate or external slip frame. It is a further particular object of the invention to minimize the amount of material waste at an edge or edges of the molded product. Another object of the invention is to reduce the size and space requirement of a molding apparatus or system. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in a molding apparatus for molding a sheet-form raw material blank to form a molded product. The apparatus comprises an upper or first mold tool including a first inner core mold and a first outer edge mold, as well as a lower or second mold tool including a second inner core mold and a second outer edge mold. The outer edge molds are arranged adjacent to an edge of the inner core molds. Respective drive devices such as piston-cylinder devices drive the first and second outer edge molds relative to a machine frame, so as to open or close the outer edge molds relative to each other. Further drive devices drive the first and second inner core molds relative to the first and second outer edge molds, so as to open or close the inner core molds relative to each other. Thereby, the outer edge molds clamp and hold an edge rim of the raw material blank therebetween, while the inner core molds carry out the three-dimensionally contoured molding of the central main body of the raw material blank therebetween. The outer edge molds hold the edge rim of the raw material blank with sufficient clamping friction to support the raw material blank yet allow slippage thereof (in the manner of a slip frame) as additional material is needed and pulled into the mold cavity between the inner core molds while the three-dimensional deformation of the raw material blank progresses between the inner core molds.

The above objects have further been achieved according to the invention in a method of molding a sheet-form raw material blank to form a molded product. The method can be carried out using an apparatus according to the invention. The method involves providing a sheet-form raw material blank between the first and second mold tools, then moving and clamping the first and second outer edge molds together so as to clampingly hold an edge rim of the raw material blank, thereafter moving and closing the first and second inner core molds together so as to carry out the three-dimensional molding deformation of the raw material blank, while allowing at least some slipping of the edge rim of the raw material blank between the first and second outer edge molds inwardly toward the mold cavity formed between the first and second inner core molds. Finally, the first and second mold tools are opened relative to each other, and the molded product may be removed from the mold cavity.

The molding process involves the application of pressure and heat in any suitable conventionally known or future developed manner and/or range. For example, the raw material blank may have been pre-heated to a required temperature, as well as pre-compressed and pre-laminated, immediately before being positioned between the first and second mold tools for carrying out the molding operation.

The arrangement of the mold tools relative to the raw material blank is preferably such that the edge rim of the raw material blank that is held between the first and second outer edge molds is a permanently remaining edge rim, flange or frame of the finished molded product. For example, the edge rim of the raw material blank received between the outer edge molds may form a mounting frame, welding frame, or riveting frame of the finished molded product, e.g. the finished vehicle interior trim component, by which the trim component will be mounted in the vehicle cabin interior. This remaining edge rim as a permanent part of the finished molded product is preferably a hidden or not-visible edge rim of the trim component in a final installed condition of the trim component. Thus, any mold parting line visible in the molded product, arising at a gap between the outer edge molds and the inner core molds, would be hidden in the final installed condition of the trim component. Alternatively, any such mold parting line must be positioned to coincide with a purposeful design line of the finished molded product. To avoid or minimize any such mold parting line, the gap between the outer edge molds and the inner core molds is less than 1 mm, preferably less than 0.5 mm, and especially only 0.3 mm or 0.4 mm.

Furthermore, the remaining edge rim of the finished molded product has not only been held in a slipping manner by the outer edge molds, but rather has also been compressed, laminated and molded into the final required contour or configuration of the remaining edge rim. For example, this remaining edge rim may be a flat planar rim, or may have a three-dimensionally contoured non-planar configuration. In any event, the outer edge molds thus serve not only to hold the edge rim of the material in the manner of a slip frame, but also to mold the edge rim of the material to form the permanent remaining edge rim of the finished molded product.

The inventive method and apparatus completely omit, exclude and avoid the use of a separate external slip frame for holding a surplus edge rim of the raw material blank next to the edges of the mold tools before and during the molding process. Instead, an internal (non-surplus) edge rim of the raw material blank that will form a remaining edge rim of the finished molded product is slippingly held and molded as necessary by the outer edge molds of the first and second mold tools. Thereby, the resultant edge waste that must be cut off from the edge of the finished molded product is completely avoided or at least reduced to a minimum. Namely, a small surplus edge rim may be provided to protrude outwardly beyond the outer edge molds according to the invention, to provide a margin of safety or operating tolerance of the expected amount of slippage of the raw material during the molding process. For example, instead of the typical conventional 40 to 50 mm of protruding edge waste on each side, the invention may provide 5 to 10 mm of edge waste protruding beyond the outer edge molds at the end of the molding process, just to insure that a larger-than-expected slippage has not caused the material edge to slip inwardly into the outer edge molds (which would create a void or gap of material along the remaining edge rim of the finished molded product).

BRIEF DESCRIPTION OF THE DRAWINGS

In order that the invention may be clearly understood, it will now be described in connection with example embodiments thereof, with reference to the accompanying drawings, wherein:

FIG. 2 is a schematic diagram similar to FIG. 1, but showing a slightly modified second apparatus according to the invention;

FIG. 3 is a schematic diagram of an apparatus according to FIG. 2, on a smaller scale, showing an initial step in the inventive method;

FIG. 4 is a schematic diagram similar to FIG. 3, but showing a subsequent step in the inventive method; and FIG. 5 is a schematic diagram similar to FIG. 4, but showing a further subsequent step in the inventive method.

Figure 1:
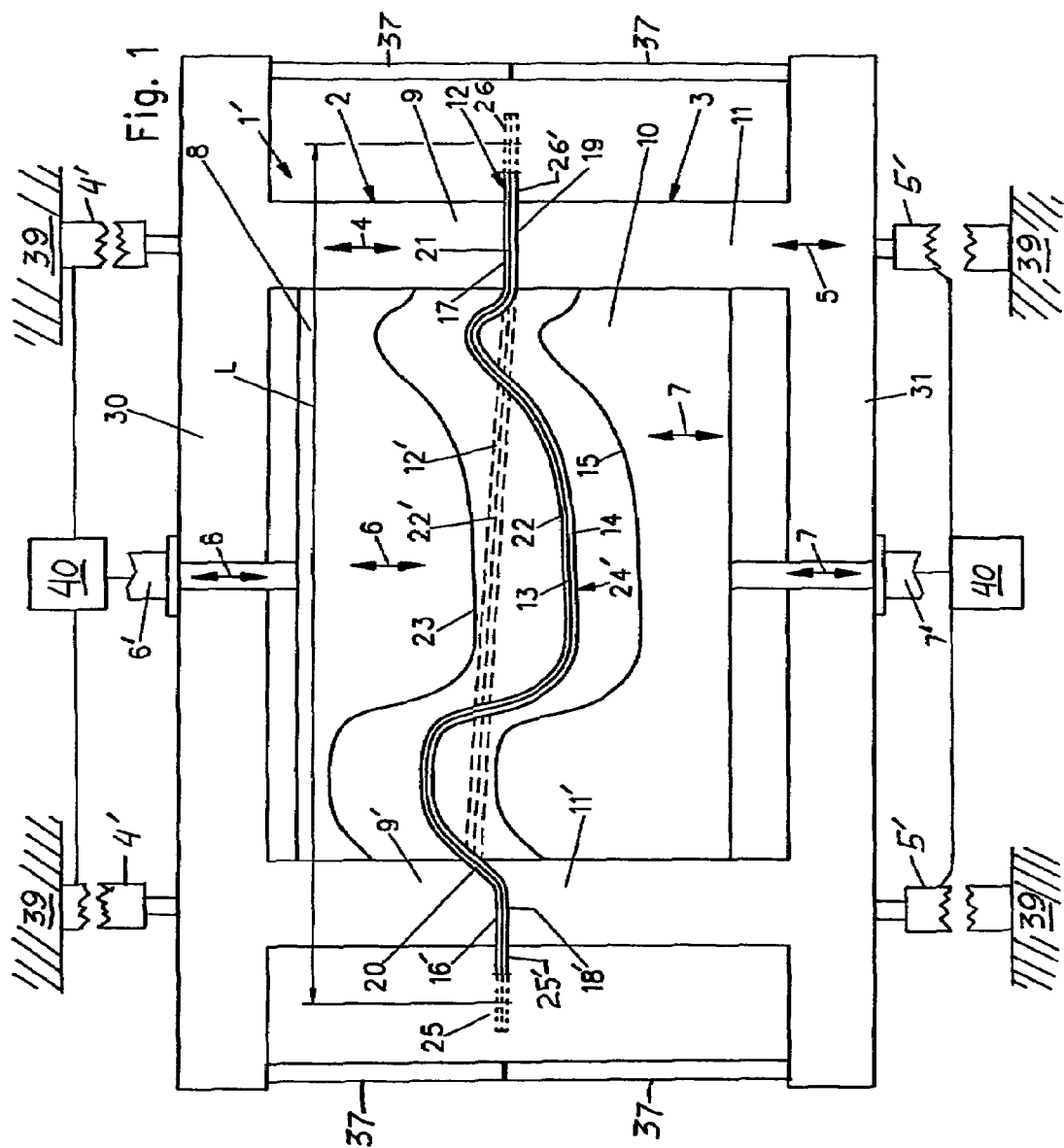
FIG. 1 is a schematic diagram of an elevation view of major components of a first apparatus according to the invention.

DETAILED DESCRIPTION OF PREFERRED EXAMPLE EMBODIMENTS AND OF THE BEST MODE OF THE INVENTION

FIGS. 1 and 2 are basically similar schematic diagrams of two slightly different variants of a molding apparatus 1, 1' according to the invention. First the similar or consistent features of the apparatuses 1 and 1' will be described, and then the difference will be described.

The apparatus 1, 1' comprises a structural machine frame 39 supporting an upper or first mold tool 2, and a lower or second mold tool 3, which are movable relative to one another and relative to the machine frame 39. More particularly, the upper or first mold tool 2 includes a main mold or inner core mold 8 and at least one outer frame or outer edge mold 9, 9' arranged at at least one lateral edge or a perimeter of the inner core mold 8. Similarly, the lower or second mold tool 3 includes an inner core mold 10 and at least one outer edge mold 11, 11' arranged at at least one lateral edge or a perimeter of the inner core mold 10. The outer edge mold or molds 9, 9' can extend continuously around the perimeter of the inner core mold 8, or can extend merely respectively along two opposite side edges of the inner core mold 8. The same considerations apply to the outer edge mold or molds 11, 11' relative to the inner core mold 10.

Preferably, the outer edge molds 9 and 9' are rigidly connected to and carried by an upper carrier structure 30, while the outer edge molds 11 and 11' are rigidly connected to and carried by a lower carrier structure 31. The upper inner core mold 8 is preferably nested in a nest space formed by the upper carrier structure 30 and the outer edge molds 9 and 9'. Similarly, the lower inner core mold 10 is preferably nested in a nest space formed by the lower carrier structure 31 and the outer edge molds 11 and 11'. The inner core molds 8 and 10 are respectively arranged closely adjacent to, yet smoothly movable relative to, the outer edge molds 9, 9' and 11, 11'. Various mechanical guides and supports for guiding and supporting the several mold members relative to one another and relative to the machine frame are also not shown in the schematic drawings for the sake of simplicity, because such guides and supports can be embodied in various different ways as understood by a person of ordinary skill according to conventional knowledge and future developments.

Preferably, a lateral gap between the respective inner core mold 8 or 10 and the respective outer edge molds 9, 9' or 11, 11' is less than 1 mm, more preferably less than 0.5 mm, and especially preferably only about 0.3 to 0.4 mm. Thus, the inner core mold 8 and the outer edge molds 9 and 9' together form an essentially continuous mold member of the upper mold tool 2, and similarly the inner core mold 10 and the outer edge molds 11 and 11' form an essentially continuous mold member of the lower mold tool 3. In this regard, the upper inner core mold 8 has a mold surface 23 that forms a continuous mold contour with mold surfaces 16, 16' and 17 of the outer edge molds 9' and 9 when the inner core mold 8 is properly positioned, and similarly the lower inner core mold 10 has a mold surface 15 that forms a continuous mold contour with the mold surfaces 18, 18' and 19 of the outer edge molds 11' and 11 when the inner core mold 10 is properly positioned. The two main mold surfaces 23 and 15 are generally mutually inverse or mating mold surfaces that form the main mold cavity for laminating, deforming and molding the main central body portion 22, 22' of a molded product 24, 24' to be formed therein.

To achieve and drive the motion of the outer edge molds 9, 9' and outer edge molds 11, 11' relative to each other and relative to the machine frame 39, any conventionally known or future developed drive elements and preferably linear drive elements such as piston-cylinder devices 4' and 5' are provided. The piston-cylinder devices 4' drive the upper carrier structure 30 and therewith the upper outer edge molds 9 and 9' relative to the machine frame 39 in a stroke direction 4. The piston-cylinder devices 5' drive the lower carrier structure 31 and therewith the lower outer edge molds 11 and 11' with a stroke motion 5 relative to the machine frame 39.

Furthermore, the inner core molds 8 and 10 are movable and driven relative to the outer edge molds 9, 9' and the outer edge molds 11, 11' respectively. In this regard, a drive element such as a piston-cylinder device 6' is secured to the upper carrier structure 30 and drives the upper inner core mold 8 with a stroke motion 6 relative to the upper carrier structure 30 and the upper outer edge molds 9, 9'. Similarly, a drive element such as a piston-cylinder device 7' is secured to the lower carrier structure 31 and drives the lower inner core mold 10 with a stroke motion 7 relative to the lower carrier structure 31 and the lower outer edge molds 11, 11'.

A controller 40, such as a computerized controller executing a suitable control program, controls the operation of the drive elements 4', 5', 6' and 7' appropriately to carry out the molding operation sequence as will be described below. In general, it can already be understood from FIGS. 1 and 2, that the outer edge molds 9, 9', 11, 11' form a static reference, relative to which the inner core molds 8, 10 are driven. This is significant for the different functions and operational steps to be carried out by the outer edge molds relative to the inner core molds as will be described below.

The apparatus 1, 1' is employed to deform and mold a multi-layered laminated sheet-form raw material blank 12 from its initial flat, planar sheet-like configuration into a three-dimensionally contoured molded configuration of a finished molded product 24, 24', such as an interior trim component for a motor vehicle. In the present example, the raw material blank 12 is a two-layered laminated sandwich including, for example, a decorative cover layer or cover sheet 13 laminated onto a carrier layer or substrate 14, which itself may be a multi-layered substrate. The cover sheet or layer 13 may also include plural different layers, such as a cover skin and a foam layer. In its initial condition, at least the carrier layer or substrate 14 is in the form of a web, sheet, or mat and preferably comprises thermoplastic fibers that will serve as a meltable matrix and hot-melt adhesive, and preferably additional fibers serving as a reinforcement or filler material. In general, the raw material blank 12 may include any number of layer or layers, and may comprise any suitable materials that are conventionally known or developed in the future for this purpose of producing a molded component from the initial planar sheet-form raw material blank.

Initially, the mold formed by the upper mold tool 2 and the lower mold tool 3 is open to provide an open mold cavity between the upper and lower mold tools 2 and 3, and the flat planar sheet-form raw material blank 12 is transported into the open mold cavity between the upper and lower mold tools 2 and 3 by any conventionally known or future developed sheet material feeder transport mechanism, such as a mechanism including a clamp frame or a needle frame holding the perimeter edges of the raw material blank 12. The initial flat planar condition 12' of the raw material blank 12 is shown by dashed lines in FIGS. 1 and 2. Immediately preceding this, the several layers 13, 14 of the raw material blank 12 have preferably been pre-heated to the required molding temperature, and pre-compressed, laminated and bonded together to form the raw material blank 12. Thus, the raw material blank 12 in its initial condition to start the molding process is preferably already pre-compressed, pre-laminated and pre-heated to the required molding temperature, when it is transported into the mold apparatus 1, 1'.

Once the raw material blank 12 has been transported into the open mold apparatus, the molding operation begins, by the controller 40 actuating the piston-cylinder devices 4' and 5' to close the upper outer edge molds 9, 9' and the lower outer edge molds 11, 11' toward one another, while the inner core molds 8 and 10 remain retracted away from one another so as not to contact the raw material blank. This is the condition of the mold apparatus 1, 1' shown in FIGS. 1 and 2. At this time, the raw material blank 12 still has the initial flat planar configuration 12' shown by dashed lines. Thereby, outer edge rims 20 and 21 are clampingly held between the mold surfaces 16, 16' and 17 of the upper outer edge molds 9' and 9 and the mold surfaces 18, 18' and 19 of the lower outer edge molds 11' and 11. Thereby, the holding of the raw material blank 12 is taken over by the outer edge molds 9, 9', 11, 11' from the sheet feeder or transport mechanism (not shown). In other words, the edges of the raw material blank 12 are released from the transport mechanism and instead the raw material blank is held only at its edge rim portions 20 and 21 only by the outer edge molds 9, 9', 11, 11'.

The molding apparatus 1, 1' does not include any slip frame that externally holds the perimeter edges of the raw material blank. Instead, the outer edge molds 9 and 9' cooperate with the outer edge molds 11 and 11' to function initially as a slip frame for holding the edge rims 20 and 21 of the raw material blank 12 with a suitable degree of holding pressure to hold the raw material blank 12 with sufficient tension to avoid drooping, sagging or creasing thereof, while permitting the slipping thereof during the further molding process as the raw material blank 12 is three-dimensionally deformed from the flat planar initial condition 12' (shown with dashed lines) to the final three-dimensional contoured configuration of the finished molded product 24, 24' (shown with solid lines) as will be explained below.

In this regard, in order to ensure exactly the correct required clamp-holding pressure exerted by the outer edge molds 9, 9', 11, 11' onto the edge rims 20 and 21 of the raw material blank 12, the fully closed position of the upper outer edge molds relative to the lower outer edge molds is defined, for example, by mechanical spacer or stop members 37, which are merely schematically indicated in principal in FIG. 1. Namely, the piston-cylinder devices 4' and 5' drive the upper outer edge molds 9, 9' and the lower outer edge molds 11, 11' respectively toward one another according to the linear motions 4 and 5, until the motion is positively stopped by contact of the respective cooperating mechanical stop members 37 against one another. These stop members may be adjustable, and provide exactly the required spacing distance between the mold surfaces 16, 16' and 18, 18' and between the mold surfaces 17 and 19 of the respective cooperating outer edge molds, depending on the thickness and other characteristics of the raw material blank 12 for example, in order to achieve exactly the required holding pressure on the edge rims 20 and 21 of the raw material blank 12 to allow the necessary slippage thereof.

Next, the controller 40 actuates the piston-cylinder devices 6' and 7' to drive the inner core molds 8 and 10 toward one another according to the linear closing stroke motion 6 and 7, while the outer edge molds remain closed against one another to the extent permitted by the stop members 37. Thereby, the mold surface 23 of the upper inner core mold 8 and the mold surface 15 of the lower inner core mold 10 contact and press against the opposite surfaces of the raw material blank 12. The inner core molds 8 and 10 are driven to their final closed position, so as to three-dimensionally deform and mold the raw material blank 12 under heat and pressure, so as to form the three-dimensionally contoured finished molded product 24, 24'. The three-dimensional deformation and molding of the raw material blank 12 necessarily requires additional material to avoid stretching and thinning of the material. This additional required material is provided by the lateral inward slippage of the edge rims 20, 21 being held between the upper outer edge molds 9, 9' and the lower outer edge molds 11, 11'.

The slippage of the raw material blank 12 can be understood in FIG. 1, by noting the length difference between the initial protruding rims 25 and 26 (shown with dashed lines) protruding laterally outwardly from the outer edge molds 9, 9', 11, 11' in the initial condition, and the final remaining protruding rims 25' and 26' (shown with solid lines) that remain protruding laterally outwardly from the outer edge molds 9, 9', 11, 11' after the molding process has been completed. If the required amount of slippage can be exactly pre-determined, and technical tolerances and variations can be minimized or avoided, then the final remaining protruding rims 25' and 26' can be entirely avoided or minimized. Nonetheless, the inventive process preferably allows for a small remaining protruding rim 25', 26' of about 5 to 10 mm on each side, to accommodate production tolerances, variations in the actual amount of slippage and the like, to ensure that a greater-than-expected slippage does not cause the edge of the available material to slip inwardly into the mold and thereby form a gap defect at the edge of the finished molded product 24, 24'.

In FIG. 1, note that the indicated dimension L represents the expected amount of material needed in the initial condition of the raw material blank 12 to account for the actual contour length of the finished molded product 24, 24' in the pertinent direction. Also note that a small amount of excess material is purposely provided as a "safety margin" as mentioned above, beyond the expected required length L, and this safety margin ultimately forms the final remaining protruding rim 25', 26' after the molding operation is completed. The final remaining protruding rims 25' and 26' are ultimately trimmed off as waste. This trimming can be carried out by any conventionally known or future developed stamping, cutting, or trimming apparatus or device (not shown).

While the above description involves independent motion of the upper outer edge molds 9, 9', the upper inner core molds 8, the lower outer edge molds 11, 11', and the lower inner core mold 10 independently and relative to one another, the arrangement of drive elements and the operation thereof could be simplified. For example, instead of moving both mold members relative to each other and relative to the machine frame, one of the mold members could be held stationary, while only the other mold member moves. Namely, for example, the drive devices 5' could be omitted. In any event, a person of ordinary skill in the art will readily understand how to achieve the required relative motions by moving either one or both of the cooperating mold members in each situation. Also, it should be understood that various mold members can be moved simultaneously or sequentially.

When the inner core molds 8 and 10 are driven closed relative to each other, the mold closing force applied by the piston-cylinder devices 6' and 7' for the mold closing motion 6, 7 must not be so great as to overcome the closing force of the outer edge molds 9, 9', 11, 11' and thereby open the outer edge molds. For example, either the mold closing force exerted by the piston-cylinder devices 4' and 5' against the stop members 37 must be greater than the mold closing force exerted by the piston-cylinder devices 6' and 7', or the outer edge molds must be mechanically locked in the closed position (for example by locking together the stop members 37 once they reach the stopped contacting condition). If applicable, the mechanical locking of the closed condition of the outer edge molds can be achieved in any conventionally known or future developed manner, for example involving the insertion of a locking pin into aligned locking holes of components of the opposite mold members, or the engagement of a locking hook or locking bail over a locking stud, or the like. In any event, the locking mechanism in the locked condition must withstand the molding forces exerted by the piston-cylinder devices 6' and 7' in excess of the forces applied by the piston-cylinder devices 4' and 5', if applicable, to maintain the closed condition of the outer edge molds acting as a static reference and as a slip frame during the molding operation by the inner core molds 8 and 10.

Moreover, the mold surfaces 16, 16', 17, 18, 18' and 19 of the outer edge molds 9', 9, 11', 11 serve not only for the slip-allowing holding of the raw material blank 12, but also for the compression, lamination and molding of the edge rims 20 and 21 of the raw material blank 12. In this regard, the edge rim 21 may have a simple flat planar configuration achieved between flat planar contours of the mold surfaces 17 and 19 at the right side of FIG. 1 (and similarly for both edge rims by the mold surfaces 16, 17, 18, 19 at both the left and right sides in FIG. 2), or the edge rim 20 can be deformed to a three-dimensionally contoured and molded configuration between correspondingly non-planar contoured mold surfaces 16' and 18' of the outer edge molds 9' and 11' as shown at the left side of the apparatus 1' in FIG. 1. In this regard, the applied molding force must be sufficient to achieve the desired three-dimensional deformation, yet the properly adjusted stop members 37 still must ensure that the material of the edge rim 20 can slip laterally inwardly during the molding process by the inner core molds as necessary.

Thus, the above mentioned minor difference or modification of the apparatus 1' according to FIG. 1 relative to the apparatus 1 according to FIG. 2 merely involves the just-mentioned provision of a three-dimensional contour of the mold surfaces 16' and 18' of the outer edge molds 9' and 11' in FIG. 1 to form a non-planar contoured edge rim of the molded product 24', relative to the flat planar mold surfaces 16 and 18 in the embodiment of the apparatus 1 according to FIG. 2 to form a flat planar edge rim of the molded product 24.

It should also be noted that the embodiment of FIGS. 2 to 5 involves the initial condition 12' of the raw material blank 12 lying along a horizontal plane 35 (see FIG. 4), but the embodiment of FIG. 1 makes clear that such a horizontal plane for the initial clamped condition 12' of the raw material blank 12 is not necessary. In other words, in the initial condition 12' of the raw material blank 12 held by the outer edge molds in FIG. 1, the central body portion 22' of the raw material blank 12 extends along a slightly sloping non-horizontal plane. Various different configurations can be carried out as needed in this regard, depending on the required final molded configuration of the molded product and other considerations.

After completion of the above described molding process, the upper and lower mold tools 2 and 3 are opened by retracting the several piston-cylinder devices 4', 5', 6' and 7'. The resulting finished molded product 24, 24' is cooled and thereby solidified or rigidified to maintain its three-dimensionally molded contour as shown by solid lines in FIGS. 1 and 2. In this regard, the mold members may be cooled by circulating a tempering fluid through channels therein, or additional cooling devices can be provided to cool the molded product 24, 24' after it is removed from the molding apparatus.

In the finished condition, the initial protruding rims 25 and 26 have at least partially slipped laterally inwardly as the edge rims 20 and 21 were pulled inwardly to allow the three-dimensional deformation of the raw material blank 12 during the molding process. A small final remaining protruding rim 25' and 26' may remain on each side. Any such remaining protruding rim 25' and 26' is trimmed off by any suitable cutting or trimming devices. The edge rim 20, 21 (including the extra material that was pulled-in during the molding process) remains as a permanent edge rim of the finished molded product 24, 24'. For example, this edge rim may form a mounting frame, welding frame, riveting frame, or finished flange of the finished molded product 24, 24'. In any event, it is significant that the material of the edge rim 20, 21 that was slippingly held between the outer edge molds 9, 9' and the outer edge molds 11, 11' remains as a permanent edge rim portion of the finished molded product 24, 24'.

Since the small gap (less than 1 mm) between the outer edge molds and the inner core molds may form a small visible mold parting line on the finished molded product 24, 24', the product is preferably positioned relative to the mold so that this parting line coincides with a purposeful design line of a visible portion of the molded product 24, 24', or will ultimately be covered and hidden from view in the final installed condition of the molded product 24, 24', or will be covered by a further trim strip or the like.

FIGS. 3 to 5 are simplified schematic views illustrating successive stages or steps of the inventive method, which has been described in detail above and will now by summarized with reference to FIGS. 3 to 5.

As shown in FIG. 3, to start the process, the raw material blank is transported (e.g. from a pre-heating and/or pre-laminating and/or pre-compressing station, not shown) in its flat planar initial condition 12' into the open mold cavity between the retracted upper mold tool 2 and lower mold tool 3. Then, as shown in FIG. 4, the outer edge molds 9, 9', 11, 11' are closed relative to one another so as to clampingly hold the edge portions of the raw material blank while allowing slippage thereof. Next, as shown in FIG. 5, the inner core molds 8 and 10 are driven closed with respect to each other relative to the outer edge molds, so as to three-dimensionally deform and mold the main body or inner core portion of the raw material blank 12. During this molding process, the required extra material is provided by slippage of the edge portions of the raw material blank between the outer edge molds 9, 9' and the outer edge molds 11, 11'. Thereby, the larger initial protruding rims 25 and 26 have been partially pulled inwardly by slippage to leave only small final remaining protruding rims 25' and 26' in the final molded condition. Only these final remaining protruding rims 25' and 26' (e.g. 5 to 10 mm) are trimmed off as waste, or may be entirely avoided by exact dimensioning of the raw material blank in its initial condition. On the other hand, the edge rim of the material clamped between the outer edge molds remains as a permanent rim portion of the finished molded product 24.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An apparatus for molding a sheet-form raw material blank to form a molded product, said apparatus comprising:
    a machine frame;
    a first mold tool including a first outer edge mold that is relatively movable relative to said machine frame, and a first inner core mold that is arranged adjacent to said first outer edge mold and that is relatively movable relative to said first outer edge mold;
    a second mold tool including a second outer edge mold and a second inner core mold that is arranged adjacent to said second outer edge mold and that is relatively movable relative to said second outer edge mold, wherein said first and second inner core molds cooperate with one another to receive, deform and mold a main central body portion of the raw material blank therebetween, and said first and second outer edge molds cooperate with one another to receive, press and slippingly hold an edge rim of the raw material blank therebetween so as to allow the edge rim to slip toward said inner core molds while the central body portion is being deformed therebetween to form the molded product;
    a first drive device connected to said machine frame and to said first outer edge mold so as to selectively move said first outer edge mold relative to said machine frame selectively toward and away from said second outer edge mold;
    a second drive device connected to said first outer edge mold and to said first inner core mold so as to selectively move said first inner core mold relative to said first outer edge mold selectively toward and away from said second inner core mold;
    a third drive device connected to said second outer edge mold and to said second inner core mold so as to selectively move said second inner core mold relative to said second outer edge mold selectively toward and away from said first inner core mold; and
    a controller connected to and adapted to control operation of said drive devices, wherein said controller is programmed and adapted to control said drive devices so that said first and second inner core molds cooperate with one another to receive, deform and mold the main central body portion of the raw material blank therebetween, and so that said first and second outer edge molds cooperate with one another to receive, press and slippingly hold the edge rim of the raw material blank therebetween so as to allow the edge rim to slip toward said inner core molds while the central body portion is being deformed therebetween to form the molded product.

2. The apparatus according to claim 1, wherein said second outer edge mold is relatively movable relative to said machine frame, and further comprising a fourth drive device connected to said machine frame and to said second outer edge mold so as to selectively move said second outer edge mold relative to said machine frame selectively toward and away from said first outer edge mold.

3. The apparatus according to claim 1,
    wherein said first mold tool further comprises a first carrier structure that is rigidly connected to and carries said first outer edge mold, and that is connected to said first drive device, and that is connected to said second drive device, so that said first carrier structure is movable together with said first outer edge mold relative to said machine frame, and said first inner core mold is movable relative to said first carrier structure; and
    wherein said second mold tool further comprises a second carrier structure that is rigidly connected to and carries said second outer edge mold, and that is connected to said third drive device, so that said second inner core mold is movable relative to said second carrier structure which is fixed to said second outer edge mold.

4. The apparatus according to claim 3, wherein said first inner core mold nests within said first outer edge mold and said first carrier structure, and said second inner core mold nests within said second outer edge mold and said second carrier structure.

5. The apparatus according to claim 1, wherein respective clearance gaps between said first inner core mold and said first outer edge mold and between said second inner core mold and said second outer edge mold respectively each have a gap spacing size of less than 1.0 mm.

6. The apparatus according to claim 1, expressly excluding a slip frame that is adapted to slippingly hold the raw material blank and that is arranged laterally outwardly next to at least one of said first and second outer edge molds.

7. The apparatus according to claim 1, further comprising mechanical stop members that are connected to said first and second mold tools and that mechanically cooperate with one another to positively stop a relative motion of said first and second outer edge molds toward one another when a defined minimum spacing between facing mold surfaces of said first and second outer edge molds has been reached.

8. The apparatus according to claim 1, wherein said controller incorporates and executes a control program to actuate said first drive device before actuating said second and third drive devices, so that said first and second outer edge molds receive, press and slippingly hold the edge rim of the raw material blank before and while said first and second inner core molds receive, deform and mold the main central body portion of the raw material blank.

9. The apparatus according to claim 1, wherein a driving force applied by said first drive device is greater than a driving force applied by said second and third drive devices.

10. The apparatus according to claim 1, wherein said molds are arranged and configured with respect to the raw material blank, so that a waste edge of less than 10 mm at an edge of the molded product protrudes outwardly from the first and second outer edge molds.

11. The apparatus according to claim 1, wherein said molds are arranged and configured with respect to the raw material blank, so that the edge rim of the raw material blank is received, pressed, held and molded into a final edge rim configuration between said first and second outer edge molds and remains permanently as a permanent edge rim part of the molded product having the final edge rim configuration.

12. The apparatus according to claim 1, wherein facing mold surfaces of said first and second outer edge molds receive, press and slippingly hold the edge rim of the material blank and also mold the edge rim to a final required configuration of the edge rim of the molded product.

13. The apparatus according to claim 12, wherein said facing mold surfaces of said first and second outer edge molds include non-planar mold surfaces that serve to three-dimensionally deform and mold the edge rim of the raw material blank.

14. A method of using the apparatus according to claim 1 for molding said sheet-form raw material blank to form said molded product, said method comprising the steps:
   a) pressing and slippingly holding said edge rim of said raw material blank between said first and second outer edge molds, so as to support said raw material blank yet allow slipping thereof under a tension higher than that arising for said support;
   b) beginning after a beginning of said step a), deforming and molding said main central body portion of said raw material blank between said first and second inner core molds so as to form a molded central body portion of said molded product;
   c) during said step b), continuing said step a) and thereby allowing said slipping of said raw material blank between said first and second outer edge molds toward said first and second inner core molds, and molding said edge rim of said raw material blank between said first and second outer edge molds to form a molded edge rim of said molded product; and
   d) permanently retaining said molded edge rim as a permanent part of said molded product.

15. The method according to claim 14, expressly excluding any and all additional holding of said edge rim of said raw material blank laterally outwardly from said first and second outer edge molds during said steps a), b) and c).

16. The method according to claim 14, wherein said molding in said step c) comprises deforming said edge rim out of a flat planar configuration into a non-planar molded contour configuration of said molded edge rim of said molded product.

17. The method according to claim 14, wherein said molded product is a vehicle interior trim component, and said molded edge rim is a mounting frame, a mounting flange, a welding frame, or a riveting frame of said trim component.

18. The method according to claim 14, wherein said raw material blank is a multi-layered laminated sandwich material blank including a supportive substrate layer and a cover layer, and wherein said substrate layer includes meltable thermoplastic fibers and reinforcement or filler fibers.

19. The method according to claim 14, wherein a waste edge of less than 10 mm remains protruding outwardly from said molded edge rim after said step c), and further comprising trimming said waste edge off of said molded edge rim to produce said molded product not including said waste edge.

20. The method according to claim 14, further comprising establishing a holding pressure applied by said first and second outer edge molds onto said edge rim of said raw material blank in said steps a) and c) so as to allow said slipping, by positively stopping a closing motion of said first and second outer edge molds with mechanical stop members to positively achieve and enforce a predefined spacing between said first and second outer edge molds.

21. The apparatus according to claim 1, excluding any cutting device arranged between said first inner core mold and said first outer edge mold, and excluding any cutting device arranged between said second inner core mold and said second outer edge mold.

22. The apparatus according to claim 1, further comprising a cutting device arranged outwardly adjacent to said outer edge molds on an outer side thereof opposite said inner core molds.

23. The apparatus according to claim 1, wherein said first drive device comprises first and second operative drive parts that are movable relative to one another, said second drive device comprises first and second operative drive parts that are movable relative to one another, said third drive device comprises first and second operative drive parts that are movable relative to one another, said first operative drive part of said first drive device is connected to said machine frame, said second operative drive part of said first drive device is connected to said first outer edge mold, said first operative drive part of said second drive device is connected to said first outer edge mold, said second operative drive part of said second drive device is connected to said first inner core mold, said first operative drive part of said third drive device is connected to said second outer edge mold, and said second operative drive part of said third drive device is connected to said second inner core mold.

24. The apparatus according to claim 1, wherein said first, second and third drive devices are respective active powered drive devices.

25. The apparatus according to claim 24, wherein said active powered drive devices are piston-cylinder devices.

* * * * *